(12) United States Patent
Balakrishnan et al.

(10) Patent No.: US 12,118,247 B2
(45) Date of Patent: Oct. 15, 2024

(54) PERFORMANCE OF BANK REFRESH

(71) Applicant: Advanced Micro Devices, Inc., Santa Clara, CA (US)

(72) Inventors: Kedarnath Balakrishnan, Bangalore (IN); Jing Wang, Austin, TX (US); Guanhao Shen, Austin, TX (US)

(73) Assignee: Advanced Micro Devices, Inc., Santa Clara, CA (US)

( * ) Notice: Subject to any disclaimer, the term of this patent is extended or adjusted under 35 U.S.C. 154(b) by 21 days.

(21) Appl. No.: 18/086,942

(22) Filed: Dec. 22, 2022

(65) Prior Publication Data
US 2024/0211173 A1  Jun. 27, 2024

(51) Int. Cl.
*G06F 12/00* (2006.01)
*G06F 3/06* (2006.01)

(52) U.S. Cl.
CPC .......... *G06F 3/0659* (2013.01); *G06F 3/0611* (2013.01); *G06F 3/0673* (2013.01)

(58) Field of Classification Search
CPC .... G06F 3/0659; G06F 3/0611; G06F 3/0673; G06F 12/126
See application file for complete search history.

(56) References Cited

U.S. PATENT DOCUMENTS

| 9,576,637 | B1 | 2/2017 | Balakrishnan |
| 10,593,391 | B2 | 3/2020 | Zhao et al. |
| 2015/0100723 | A1* | 4/2015 | Brandl ............... G06F 13/1605 |
| | | | 711/106 |
| 2020/0020384 | A1* | 1/2020 | Zhao ................ G11C 11/40618 |

OTHER PUBLICATIONS

JEDEC Standard; "DDR5 SDRAM"; JESD79-5; JEDEC Solid State Technology Association; 3103 North 10th Street, Suite 240 South, Arlington, VA 22201; United States; Jul. 2020; 18 pages.

* cited by examiner

*Primary Examiner* — Shawn X Gu
(74) *Attorney, Agent, or Firm* — Polansky & Associates, P.L.L.C.; Paul J. Polansky

(57) ABSTRACT

A memory controller includes an arbiter. The arbiter is configured to elevate a priority of memory access requests that generate row activate commands in response to receiving a same-bank refresh request, and to send a same-bank refresh command in response to receiving the same-bank refresh request.

20 Claims, 5 Drawing Sheets

PERFORMANCE OF BANK REFRESH

BACKGROUND

Dynamic random-access memory (DRAM) chips include large arrays of memory cells which represent data as charges stored in capacitors. The charge in the capacitors tends to leak over time, requiring the memory cell to be periodically "refreshed". A refresh operation includes reading the state of the memory cell before it has leaked, and then rewriting it to restore the full amount of charge on the capacitor. The refresh operation needs to be performed within a certain time interval based on the physics of the memory cell.

Most DRAM chips sold today are compatible with various double data rate (DDR) DRAM standards promulgated by the Joint Electron Devices Engineering Council (JEDEC). The standards published by JEDEC specify a refresh cycle time that prevents the access of data for a period of time, generally designated as the refresh interval, or "$t_{REF1}$". Larger DDR DRAM chip sizes increase the amount of time required to refresh all the memory cells in the chip, and thereby increases the latency of pending read and write commands to memory cells being refreshed. For large memory chips, having storage capacities on the order of several Gigabits (Gb), the latency required to refresh the entire memory can be relatively large, such as 300-500 nanoseconds (ns), or about 1000-1600 clock cycles at current memory clock speeds.

Figure 1:
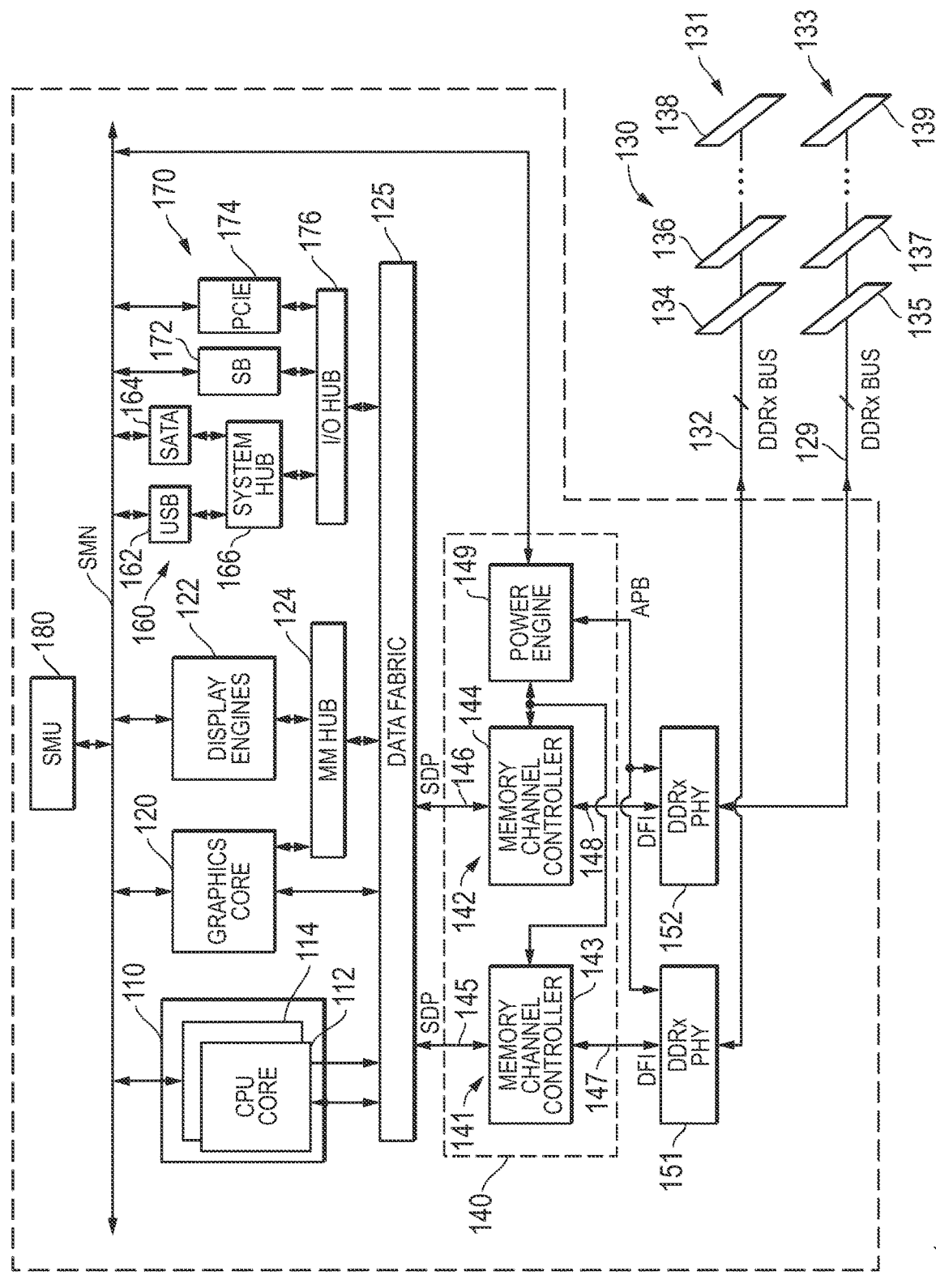
FIG. 1 illustrates in block diagram form an accelerated processing unit (APU) and memory system in which a memory controller as described herein may be used according to some embodiments.

In the following description, the use of the same reference numerals in different drawings indicates similar or identical items. Unless otherwise noted, the word "coupled" and its associated verb forms include both direct connection and indirect electrical connection by means known in the art, and unless otherwise noted any description of direct connection implies alternate embodiments using suitable forms of indirect electrical connection as well.

DETAILED DESCRIPTION OF ILLUSTRATIVE EMBODIMENTS

A memory controller includes an arbiter. The arbiter is configured to elevate a priority of memory access requests that generate row activate commands in response to receiving a same-bank refresh request, and to send a same-bank refresh command in response to receiving the same-bank refresh request.

A data processing system includes a data processor for generating memory access requests, and a memory controller coupled to the data processor for generating memory commands in response to the memory access requests. The memory controller includes a command queue, a refresh control circuit, and an arbiter. The memory controller comprises an arbiter. The arbiter is configured to elevate a priority of the memory access requests that generate row activate commands in response to receiving a same-bank refresh request, and to send a same-bank refresh command in response to receiving the same-bank refresh request.

A method includes storing memory access requests in a command queue. Same-bank refresh requests are periodically generated. Commands are selected from the command queue and a same-bank refresh command is sent to a memory interface in response to a same-bank refresh request. A priority of memory access requests in the command queue that generate row activate commands is selectively elevated in response to receiving the same-bank refresh request.

FIG. 1 illustrates in block diagram form an accelerated processing unit (APU) 100 and memory system 130 in which a memory controller as described herein may be used according to some embodiments. APU 100 is an integrated circuit suitable for use as a processor in a host data processing system, and includes generally a central processing unit (CPU) core complex 110, a graphics core 120, a set of display engines 122, a memory management hub 124, a data fabric 125, a memory controller 140, a set of peripheral controllers 160, a set of peripheral bus controllers 170, and a system management unit (SMU) 180.

CPU core complex 110 includes a CPU core 112 and a CPU core 114. In this example, CPU core complex 110 includes two CPU cores, but in other embodiments CPU core complex 110 can include any number of CPU cores. Each of CPU cores 112 and 114 is bidirectionally connected to a system management network (SMN), which forms a control fabric, and to data fabric 125, and is capable of providing memory access requests to data fabric 125. Each of CPU cores 112 and 114 may be unitary cores, or may further be a core complex with two or more unitary cores sharing certain resources such as caches.

Graphics core 120 is a high-performance graphics processing unit (GPU) capable of performing graphics operations such as vertex processing, fragment processing, shading, texture blending, and the like in a highly integrated and parallel fashion. Graphics core 120 is bidirectionally connected to the SMN and to data fabric 125, and is capable of providing memory access requests to data fabric 125. In this regard, APU 100 may either support a unified memory architecture in which CPU core complex 110 and graphics core 120 share the same memory space, or a memory architecture in which CPU core complex 110 and graphics core 120 share a portion of the memory space, while graphics core 120 also uses a private graphics memory not accessible by CPU core complex 110.

Display engines 122 render and rasterize objects generated by graphics core 120 for display on a monitor. Graphics core 120 and display engines 122 are bidirectionally connected to a common memory management hub 124 for uniform translation into appropriate addresses in memory system 130, and memory management hub 124 is bidirectionally connected to data fabric 125 for generating such memory accesses and receiving read data returned from the memory system.

Data fabric 125 includes a crossbar switch for routing memory access requests and memory responses between any memory accessing agent and memory controller 140. It also includes a system memory map, defined by basic input/output system (BIOS), for determining destinations of memory accesses based on the system configuration, as well as buffers for each virtual connection.

Peripheral controllers 160 include a universal serial bus (USB) controller 162 and a Serial Advanced Technology Attachment (SATA) interface controller 164, each of which is bidirectionally connected to a system hub 166 and to the SMN bus. These two controllers are merely exemplary of peripheral controllers that may be used in APU 100.

Peripheral bus controllers 170 include a system controller or "Southbridge" (SB) 172 and a Peripheral Component Interconnect Express (PCIe) controller 174, each of which is bidirectionally connected to an input/output (I/O) hub 176 and to the SMN bus. I/O hub 176 is also bidirectionally connected to system hub 166 and to data fabric 125. Thus for example a CPU core can program registers in USB controller 162, SATA interface controller 164, SB 172, or PCIe controller 174 through accesses that data fabric 125 routes through I/O hub 176. Software and firmware for APU 100 are stored in a system data drive or system BIOS memory (not shown) which can be any of a variety of non-volatile memory types, such as read-only memory (ROM), flash electrically erasable programmable ROM (EEPROM), and the like. Typically, the BIOS memory is accessed through the PCIe bus, and the system data drive through the SATA interface.

SMU 180 is a local controller that controls the operation of the resources on APU 100 and synchronizes communication among them. SMU 180 manages power-up sequencing of the various processors on APU 100 and controls multiple off-chip devices via reset, enable and other signals. SMU 180 includes one or more clock sources (not shown), such as a phase locked loop (PLL), to provide clock signals for each of the components of APU 100. SMU 180 also manages power for the various processors and other functional blocks, and may receive measured power consumption values from CPU cores 112 and 114 and graphics core 120 to determine appropriate power states.

Memory controller 140 and its associated physical interface circuits (PHYs) 151 and 152 are integrated with APU 100 in this embodiment. Each of physical interface circuits 151 and 152 is labelled "DDRx PHY" to indicate that they are capable of connecting to one or more double data rate memory types. Memory controller 140 includes memory channel controllers 141 and 142 and a power engine 149. Memory channel controller 141 includes a host interface 145, a memory channel controller 143, and a physical interface 147. Host interface 145 bidirectionally connects memory channel controller 143 to data fabric 125 over a serial presence detect link (SDP). Physical interface 147 bidirectionally connects memory channel controller 143 to physical interface circuit 151, and in the exemplary embodiment conforms to the DDR PHY Interface (DFI) Specification. Memory channel controller 142 includes a host interface 146, a memory channel controller 144, and a physical interface 148. Host interface 146 bidirectionally connects memory channel controller 144 to data fabric 125 over another SDP. Physical interface 148 bidirectionally connects memory channel controller 144 to physical interface circuit 152, and conforms to the DFI Specification. Power engine 149 is bidirectionally connected to SMU 180 over the SMN bus, to physical interface circuits 151 and 152 over the APB, and is also bidirectionally connected to memory channel controllers 143 and 144. PHY 151 has a bidirectional connection to memory channel 131. PHY 152 has a bidirectional connection memory channel 133.

Memory controller 140 is an instantiation of a memory controller having two memory channel controllers and uses a shared power engine 149 to control operation of both memory channel controller 143 and memory channel controller 144 in a manner that will be described further below. Each of memory channel controllers 141 and 142 can connect to state-of-the-art DDR memories such as DDR version five (DDR5), DDR version four (DDR4), low power DDR4 (LPDDR4), graphics DDR version five (GDDR5), and high bandwidth memory (HBM), and can be adapted for future memory technologies. These memories provide high bus bandwidth and high speed operation. At the same time, they also provide low power modes to save power for battery-powered applications such as laptop computers, and also provide built-in thermal monitoring.

Memory system 130 includes a memory channel 131 and a memory channel 133. Memory channel 131 includes a set of dual inline memory modules (DIMMs) connected to a DDRx bus 132, including representative DIMMs 134, 136, and 138 that in this example correspond to separate ranks. Likewise, memory channel 133 includes a set of DIMMs connected to a DDRx bus 129, including representative DIMMs 135, 137, and 139.

APU 100 operates as the central processing unit (CPU) of a host data processing system and provides various buses and interfaces useful in modern computer systems. These interfaces include two double data rate (DDRx) memory channels, a PCIe root complex for connection to a PCIe link, a USB controller for connection to a USB network, and an interface to a SATA mass storage device.

APU 100 also implements various system monitoring and power saving functions. In particular one system monitoring function is thermal monitoring. For example, if APU 100 becomes hot, then SMU 180 can reduce the frequency and voltage of CPU cores 112 and 114 and/or graphics core 120. If APU 100 becomes too hot, then it can be shut down entirely. Thermal events can also be received from external sensors by SMU 180 via the SMN bus, and SMU 180 can reduce the clock frequency and/or power supply voltage in response.

Figure 2:
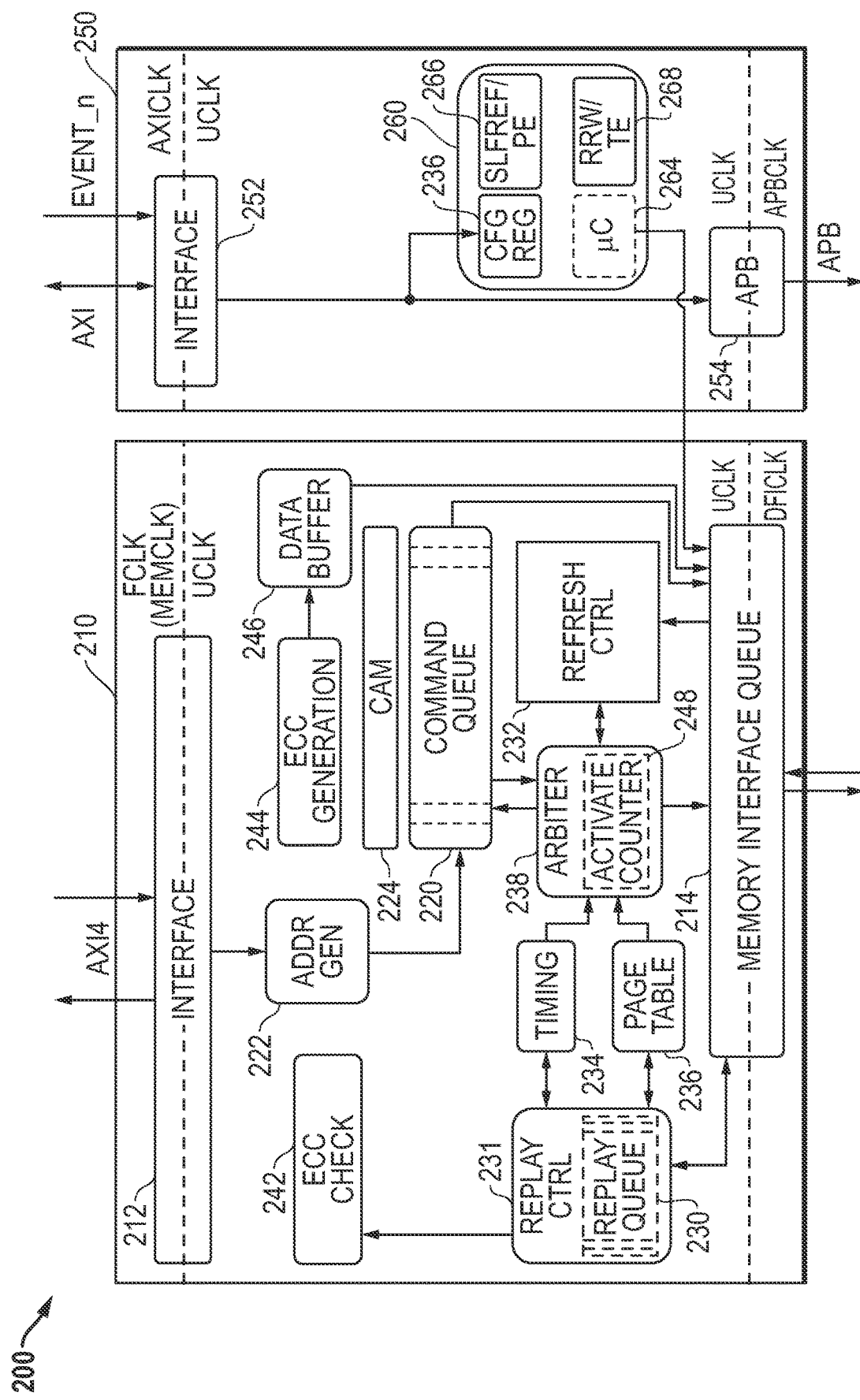
FIG. 2 illustrates in block diagram form a memory controller suitable for use in an APU like the APU of FIG. 1 according to some embodiments.

FIG. 2 illustrates in block diagram form a memory controller 200 that is suitable for use in an APU like APU 100 of FIG. 1 according to some embodiments. Memory controller 200 includes generally a memory channel controller 210 and a power controller 250. Memory channel controller 210 includes generally an interface 212, a memory interface queue 214, a command queue 220, an address generator 222, a content addressable memory (CAM) 224, replay control logic 231 including a replay queue 230, a refresh control logic block 232, a timing block 234, a page table 236, an arbiter 238, an error correction code (ECC) check circuit 242, an ECC generation block 244, a data buffer 246, and refresh logic 247.

Interface 212 has a first bidirectional connection to data fabric 125 over an external bus, and has an output. In memory controller 200, this external bus is compatible with an advanced extensible interface labelled "AXI4", but can be other types of interfaces in other embodiments. Interface 212 translates memory access requests from a first clock domain known as the FCLK (or MEMCLK) domain to a second clock domain internal to memory controller 200 known as the UCLK domain. Similarly, memory interface queue 214 provides memory accesses from the UCLK domain to a DFICLK domain associated with the DFI interface.

Address generator 222 decodes addresses of memory access requests received from data fabric 125 over the AXI4 bus. The memory access requests include access addresses in the physical address space represented in a normalized format. Address generator 222 converts the normalized addresses into a format that can be used to address the actual memory devices in memory system 130, as well as to efficiently schedule related accesses. This format includes a region identifier that associates the memory access request with a particular rank, a row address, a column address, a bank address, and a bank group. On startup, the system BIOS queries the memory devices in memory system 130 to determine their size and configuration, and programs a set of configuration registers associated with address generator 222. Address generator 222 uses the configuration stored in the configuration registers to translate the normalized addresses into the appropriate format. Command queue 220 is a queue of memory access requests received from the memory accessing agents in APU 100, such as CPU cores 112 and 114 and graphics core 120. Command queue 220 stores the address fields decoded by address generator 222 as well other address information that allows arbiter 238 to select memory accesses efficiently, including access type and quality of service (QOS) identifiers. CAM 224 includes information to enforce ordering rules, such as write after write (WAW) and read after write (RAW) ordering rules.

Error correction code (ECC) generation block 244 determines the ECC of write data to be sent to the memory. ECC check circuit 242 checks the received ECC against the incoming ECC.

Replay queue 230 is a temporary queue for storing selected memory accesses picked by arbiter 238 that are awaiting responses, such as address and command parity responses. Replay control logic 231 accesses ECC check circuit 242 to determine whether the returned ECC is correct or indicates an error. Replay control logic 231 initiates and controls a replay sequence in which accesses are replayed in the case of a parity or ECC error of one of these cycles. Replayed commands are placed in the memory interface queue 214.

Refresh control logic 232 includes state machines for various powerdown, refresh, and termination resistance (ZQ) calibration cycles that are generated separately from normal read and write memory access requests received from memory accessing agents. For example, if a memory rank is in precharge powerdown, it must be periodically awakened to run refresh cycles. Refresh control logic 232 generates refresh commands periodically and in response to designated conditions to prevent data errors caused by leaking of charge off storage capacitors of memory cells in DRAM chips. In addition, refresh control logic 232 periodically calibrates ZQ to prevent mismatch in on-die termination resistance due to thermal changes in the system.

Arbiter 238 is bidirectionally connected to command queue 220 and is the heart of memory channel controller 210, and improves efficiency by intelligent scheduling of accesses to improve the usage of the memory bus. Arbiter 238 uses timing block 234 to enforce proper timing relationships by determining whether certain accesses in command queue 220 are eligible for issuance based on DRAM timing parameters. For example, each DRAM has a minimum specified time between activate commands, known as "$t_{RC}$". Timing block 234 maintains a set of counters that determine eligibility based on this and other timing parameters specified in the JEDEC specification, and is bidirectionally connected to replay queue 230. Page table 236 maintains state information about active pages in each bank and rank of the memory channel for arbiter 238, and is bidirectionally connected to replay queue 230. Arbiter 238 includes an activate counter circuit 248, which in this embodiment has a counter for each memory region which counts a rolling number of activate commands sent over the memory channel to a memory region. The memory regions are memory banks in some embodiments, and memory sub-banks in other embodiments as further discussed below.

In response to write memory access requests received from interface 212, ECC generation block 244 computes an ECC according to the write data. Data buffer 246 stores the write data and ECC for received memory access requests. It outputs the combined write data/ECC to memory interface queue 214 when arbiter 238 picks the corresponding write access for dispatch to the memory channel.

Power controller 250 generally includes an interface 252 to an advanced extensible interface, version one (AXI), an advanced peripheral bus (APB) interface 254, and a power engine 260. Interface 252 has a first bidirectional connection to the SMN, which includes an input for receiving an event signal labeled "EVENT_n" shown separately in FIG. 2, and an output. APB interface 254 has an input connected to the output of interface 252, and an output for connection to a PHY over an APB. Power engine 260 has an input connected to the output of interface 252, and an output connected to an input of memory interface queue 214. Power engine 260 includes a set of configuration registers 262, a microcontroller (μC) 264, a self refresh controller (SLFREF/PE) 266, and a reliable read/write timing engine (RRW/TE) 268. Configuration registers 262 are programmed over the AXI bus, and store configuration information to control the operation of various blocks in memory controller 200. Accordingly, configuration registers 262 have outputs connected to these blocks that are not shown in detail in FIG. 2. SLFREF/PE 266 is an engine that allows the manual generation of refreshes in addition to the automatic generation of refreshes by refresh control logic 232. Reliable read/write timing engine 268 provides a continuous memory access stream to memory or I/O devices for such purposes as DDR interface maximum read latency (MRL) training and loopback testing.

Memory channel controller 210 includes circuitry that allows it to pick memory accesses for dispatch to the associated memory channel. In order to make the desired arbitration decisions, address generator 222 decodes the address information into predecoded information including rank, row address, column address, bank address, and bank group in the memory system, and command queue 220 stores the predecoded information. Configuration registers 262 store configuration information to determine how address generator 222 decodes the received address information. Arbiter 238 uses the decoded address information, timing eligibility information indicated by timing block 234, and active page information indicated by page table 236 to efficiently schedule memory accesses while observing other criteria such as quality of service (QOS) requirements. For example, arbiter 238 implements a preference for accesses to open pages to avoid the overhead of precharge and activation commands required to change memory pages, and hides overhead accesses to one bank by interleaving them with read and write accesses to another bank. In particular, during normal operation, arbiter 238 normally keeps pages open in different banks until they are required to be precharged prior to selecting a different page. Arbiter 238, in some embodiments, determines eligibility for command selection based on at least on respective values of activate counter 248 for target memory regions of the respective commands.

Figure 3:
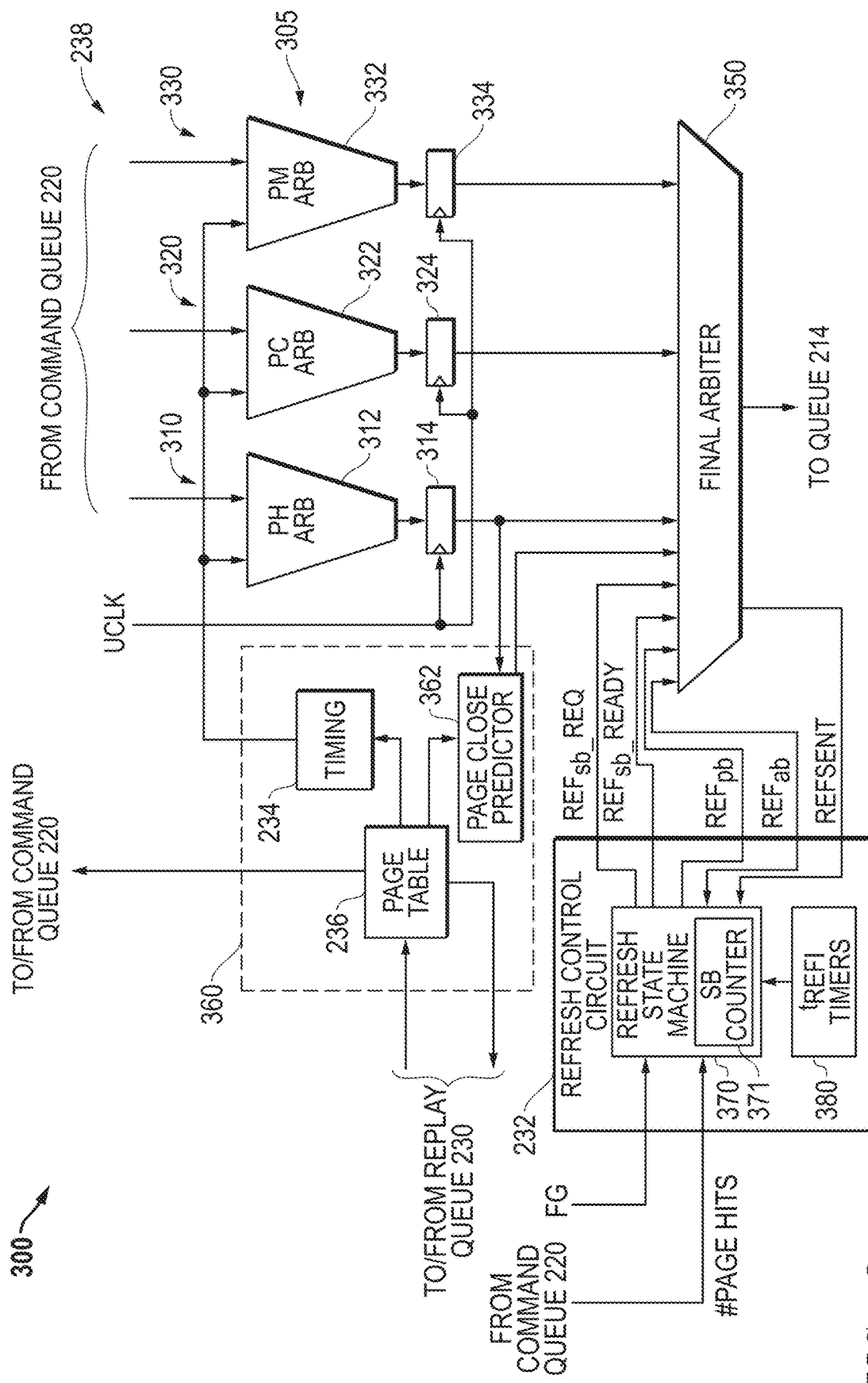
FIG. 3 illustrates a block diagram of a memory controller corresponding to a portion of the memory controller of FIG. 2 according to some embodiments.

FIG. 3 illustrates a block diagram of a memory controller 300 corresponding to a portion of memory controller 200 of FIG. 2 according to some embodiments. Memory controller 300 is suitable for use in a memory controller for various DDR, GDDR, and other similar DRAM types. Memory controller 300 includes refresh control logic 232, arbiter 238, and a set of control circuits 360 associated with the operation of arbiter 238. Arbiter 238 includes a set of sub-arbiters 305 and a final arbiter 350. Sub-arbiters 305 include a sub-arbiter 310, a sub-arbiter 320, and a sub-arbiter 330. Sub-arbiter 310 includes a page hit arbiter 312 labeled "PH ARB", and an output register 314. Page hit arbiter 312 has a first input connected to command queue 220, a second input connected to timing block 234, and an output. Register 314 has a data input connected to the output of page hit arbiter 312, a clock input for receiving the UCLK signal, and an output. Sub-arbiter 320 includes a page conflict arbiter 322 labeled "PC ARB", and an output register 324. Page conflict arbiter 322 has a first input connected to command queue 220, a second input connected to timing block 234, and an output. Register 324 has a data input connected to the output of page conflict arbiter 322, a clock input for receiving the UCLK signal, and an output. Sub-arbiter 330 includes a page miss arbiter 332 labeled "PM ARB", and an output register 334. Page miss arbiter 332 has a first input connected to command queue 220, a second input connected to timing block 234, and an output. Register 334 has a data input connected to the output of page miss arbiter 332, a clock input for receiving the UCLK signal, and an output. Final arbiter 350 has a first set of inputs connected to the output of refresh control logic 232, a second input from a page close predictor 362, a third input connected to the output of output register 314, a fourth input connected to the output of output register 324, a fifth input connected to the output of output register 334, a first output for providing a signal labelled "REFSENT", and a second output for providing one or more arbitration winners to queue 214.

Refresh control circuit 232 includes a refresh state machine 370, and a set of refresh interval timers 380 labelled "$t_{REF1}$ TIMERS". Refresh state machine 370 has a first input for receiving a fine-granularity control signal labelled "FG", a second input connected to command queue 220 for receiving information for determining a number of page hits in command queue 220, a third input for receiving the REFSENT signal, a first output for providing a same-bank refresh request labelled "$REF_{sb}\_REQ$", a second output for providing a same-bank refresh ready signal labelled "$REF_{sb}\_READY$", a third output for providing a per-bank refresh requests labelled "$REF_{pb}$", and an optional fourth output for providing an all-bank refresh signal labelled "$REF_{ab}$". As part of the same-bank refresh protocol, refresh state machine 370 includes a bank counter labelled "SB COUNTER" that allows it to signal the bank number to be refreshed in each bank group during a $REF_{SB}$ command so final arbiter 350 can determine the commands in command queue 220 suitable for issuance to memory. Refresh interval timers 380 keep track of timing information used by refresh state machine 370, including the expiration of the $t_{REF1}$ interval, the expiration of portions of the $t_{REF1}$ interval used to make same-bank and per-bank refresh requests, and information related to same-bank refresh requests becoming ready for issuance shortly.

In general, arbitration proceeds as follows. Arbiter 238 selects memory access requests (commands) from command queue 220 and refresh control logic 232 by taking into account the page status of each entry, the priority of each memory access request, and the dependencies between requests. The priority is related to the quality of service or QoS of requests received from the AXI4 bus and stored in command queue 220, but can be altered based on the type of memory access and the dynamic operation of arbiter 238. Arbiter 238 includes three sub-arbiters that operate in parallel to address the mismatch between the processing and transmission limits of existing integrated circuit technology. The winners of the respective sub-arbitrations are presented to final arbiter 350. Final arbiter 350 selects one or more commands between these three sub-arbitration winners as well as a refresh operation from refresh control logic 232, and may further modify a read or write command into a read or write with auto-precharge command as determined by page close predictor 362.

Each of page hit arbiter 312, page conflict arbiter 322, and page miss arbiter 332 has an input connected to the output of timing block 234 to determine timing eligibility of commands in command queue 220 that fall into these respective categories. Timing block 234 includes an array of binary counters that count durations related to the particular operations for each bank in each rank. The number of timers needed to determine the status depends on the timing parameter, the number of banks for the given memory type, and the number of ranks supported by the system on a given memory channel. The number of timing parameters that are implemented in turn depends on the type of memory implemented in the system. For example, GDDR5 memories require more timers to comply with more timing parameters than other DDRx memory types. By including an array of generic timers implemented as binary counters, timing block 234 can be scaled and reused for different memory types.

A page hit is a read or write cycle to an open page. Page hit arbiter 312 arbitrates between accesses in command queue 220 to open pages. The timing eligibility parameters tracked by timers in timing block 234 and checked by page hit arbiter 312 include, for example, row address strobe (RAS) to column address strobe (CAS) delay time ($t_{RCD}$) and CAS latency ($t_{CL}$). For example, $t_{RCD}$ specifies the minimum amount of time that must elapse before a read or write access to a page after it has been opened in a RAS cycle. Page hit arbiter 312 selects a sub-arbitration winner based on the assigned priority of the accesses. In one embodiment, the priority is a 4-bit, one-hot value that therefore indicates a priority among four values, however it should be apparent that this four-level priority scheme is just one example. If page hit arbiter 312 detects two or more requests at the same priority level, then the oldest entry wins.

A page conflict is an access to one row in a bank when another row in the bank is currently activated. Page conflict arbiter 322 arbitrates between accesses in command queue 220 to pages that conflict with the page that is currently open in the corresponding bank and rank. Page conflict arbiter 322 selects a sub-arbitration winner that causes the issuance of a precharge command. The timing eligibility parameters tracked by timers in timing block 534 and checked by page conflict arbiter 322 include, for example, active to precharge command period ($t_{RAS}$). Page conflict arbiter 322 selects a sub-arbitration winner based on the assigned priority of the access. If page conflict arbiter 322 detects two or more requests at the same priority level, then the oldest entry wins.

A page miss is an access to a bank that is in the precharged state. Page miss arbiter 332 arbitrates between accesses in command queue 220 to precharged memory banks. The timing eligibility parameters tracked by timers in timing block 234 and checked by page miss arbiter 332 include, for example, precharge command period ($t_{RP}$). If there are two or more requests that are page misses at the same priority level, then the oldest entry wins.

Each sub-arbiter outputs a priority value for its respective sub-arbitration winner. Final arbiter 350 compares the priority values of the sub-arbitration winners from each of page hit arbiter 312, page conflict arbiter 322, and page miss arbiter 332. Final arbiter 350 determines the relative priority among the sub-arbitration winners by performing a set of relative priority comparisons taking into account two sub-arbitration winners at a time.

After determining the relative priority among the three sub-arbitration winners, final arbiter 350 then determines whether the sub-arbitration winners conflict (i.e. whether they are directed to the same bank and rank). When there are no such conflicts, then final arbiter 350 selects up to two sub-arbitration winners with the highest priorities. When there are conflicts, then final arbiter 350 complies with the following rules. When the priority value of the sub-arbitration winner of page hit arbiter 312 is higher than that of page conflict arbiter 322, and they are both to the same bank and rank, then final arbiter 350 selects the access indicated by page hit arbiter 312. When the priority value of the sub-arbitration winner of page conflict arbiter 322 is higher than that of page hit arbiter 312, and they are both to the same bank and rank, final arbiter 350 selects the winner based on several additional factors. In some cases, page close predictor 362 causes the page to close at the end of the access indicated by page hit arbiter 312 by setting the auto precharge attribute.

Within page hit arbiter 312, priority is initially set by the request priority from the memory accessing agent but is adjusted dynamically based on the type of accesses (read or write) and the sequence of accesses. In general, page hit arbiter 312 assigns a higher implicit priority to reads, but implements a priority elevation mechanism to ensure that writes make progress toward completion.

Whenever page hit arbiter 312 selects a read or write command, page close predictor 362 determines whether to send the command with the auto-precharge (AP) attribute or not. During a read or write cycle, the auto-precharge attribute is set with a predefined address bit and the auto-precharge attribute causes the DDR device to close the page after the read or write cycle is complete, which avoids the need for the memory controller to later send a separate precharge command for that bank. Page close predictor 362 takes into account other requests already present in command queue 220 that access the same bank as the selected command. If page close predictor 362 converts a memory access into an AP command, the next access to that page will be a page miss.

Refresh Operation

To address refresh latency issues, JEDEC adopted a feature for DDR, version four (DDR4) memories known as fine granularity (FG) refresh. When fine granularity refresh is selected, the memory will refresh only a single bank at a time and maintain an internal counter to keep track of the next memory bank to be refreshed. If the memory has 32 banks, then the memory controller issues FG refresh commands at an average rate of $t_{REF1}/32$. While the other banks are generally available for memory operations while a given bank is being refreshed, the memory controller must place all banks into the idle state prior to issuing the FG refresh command, increasing refresh overhead. Thus, the fine granularity refresh mode improves command latency, but still requires significant overhead because of the need to repetitively place all banks into the idle state before issuing refresh commands to a given bank.

The most recent DDR standard is version 5 (DDR5). DDR5 introduced a new refresh command, known as "same-bank" refresh, that lowers the refresh overhead. DDR versions starting with DDR4 combined memory banks into "bank groups" that share some common circuitry while imposing some restrictions on operations that can occur in multiple banks in the same bank group at around the same time. The same-bank refresh command allows one corresponding memory bank in each bank group to be refreshed concurrently while the other memory banks are available for read and write operations. Thus, the same-bank refresh command offers the possibility of maintaining low latency like the per-bank refresh command, but also reducing the overhead of the refresh operations to improve overall bus efficiency. However, further performance improvements using the same-bank refresh command would be desirable.

Memory controller 300 leverages the capabilities of the new DDR5 bank refresh command known as same-bank refresh or "$REF_{sb}$," to obtain higher bus utilization and lower bus latency. It takes into account other conditions in the memory controller, and schedules activate commands in a way that achieves better efficiency, while keeping other mechanisms to ensure fairness among accesses and low latency for memory accessing agents. In particular, it includes refresh control logic that provides information to final arbiter 350 about upcoming same bank refreshes and selects between other pending accesses to allow the memory controller to reduce the overhead associated with the same bank refresh command.

In general, refresh control logic 232 is capable of generating periodic refresh requests including normal refresh commands in fine granularity (FG) mode, also known as per-bank refresh ($REF_{pb}$) commands, and same bank refresh ($REF_{sb}$) commands. In some embodiments, it may also allow the memory controller to issue "normal" or all-bank refresh ($REF_{ab}$) requests when not in fine-granularity mode, although this refresh mode is less useful in large, multi-core processors in which low latency is important. Firmware or the operating system will determine the mode and program memory controller 200 and the memory devices in the system appropriately.

The $REF_{ab}$ or "normal" all-bank refresh command is used to refresh an entire memory chip. All banks of the memory chip need to be in the precharged state before the $REF_{ab}$ can be issued. A refresh controller internal to the DRAM issues all bank refresh requests. As required by the JEDEC standard refresh control logic circuit 232 generates two $REF_{ab}$ commands during every $t_{REF1}$ interval. The FG signal is inactive, and the FG control bit in the memory's mode register is also inactive to indicate normal refresh mode. The $REF_{ab}$ command imposes the longest latency for pending memory access requests, on the order of 300-500 nanoseconds (ns) for a DDR5 memory in currently achievable speeds. Because of these high latencies, the all-bank refresh command may be unsuitable for use in high-performance computer systems.

The $REF_{pb}$ command is used to refresh one bank of a selected memory device. It relies on a bank counter in each memory to determine the next sequential bank to refresh. Memory controller 200 issues it to a memory device as an $REF_{ab}$ command in which the FG bit has been set in the DRAM's mode register. Because it is issued as an $REF_{ab}$ command, all banks of the memory device need to be in the precharged state before memory controller can issue the $REF_{ab}$ command. The $REF_{pb}$ command is less efficient than the $REF_{ab}$ command because of the high overhead of starting and completing many single bank refreshes, but it provides a much shorter latency than the $REF_{ab}$ command for pending memory access requests.

The $REF_{sb}$ command is used to refresh one corresponding bank in each of multiple bank groups. Each $REF_{sb}$ command increments an internal bank counter and once the bank counter equals the total number of available banks in a bank group, it will be reset and start over on the next subsequent $REF_{sb}$ command. Each $REF_{sb}$ command provides improved efficiency compared to the $REF_{pb}$ command because of the concurrent refresh operations taking place in one bank of each bank group. Once the $REF_{sb}$ has been issued, the target banks in each bank group are inaccessible until the expiration of the refresh period. However, the other banks are accessible and can be addressed during the $REF_{sb}$ cycle, subject to certain timing restrictions.

A memory controller can exploit these timing restrictions to further reduce the effective latency of the system while improving overall memory bus utilization compared to the $REF_{pb}$ command.

Figure 4:
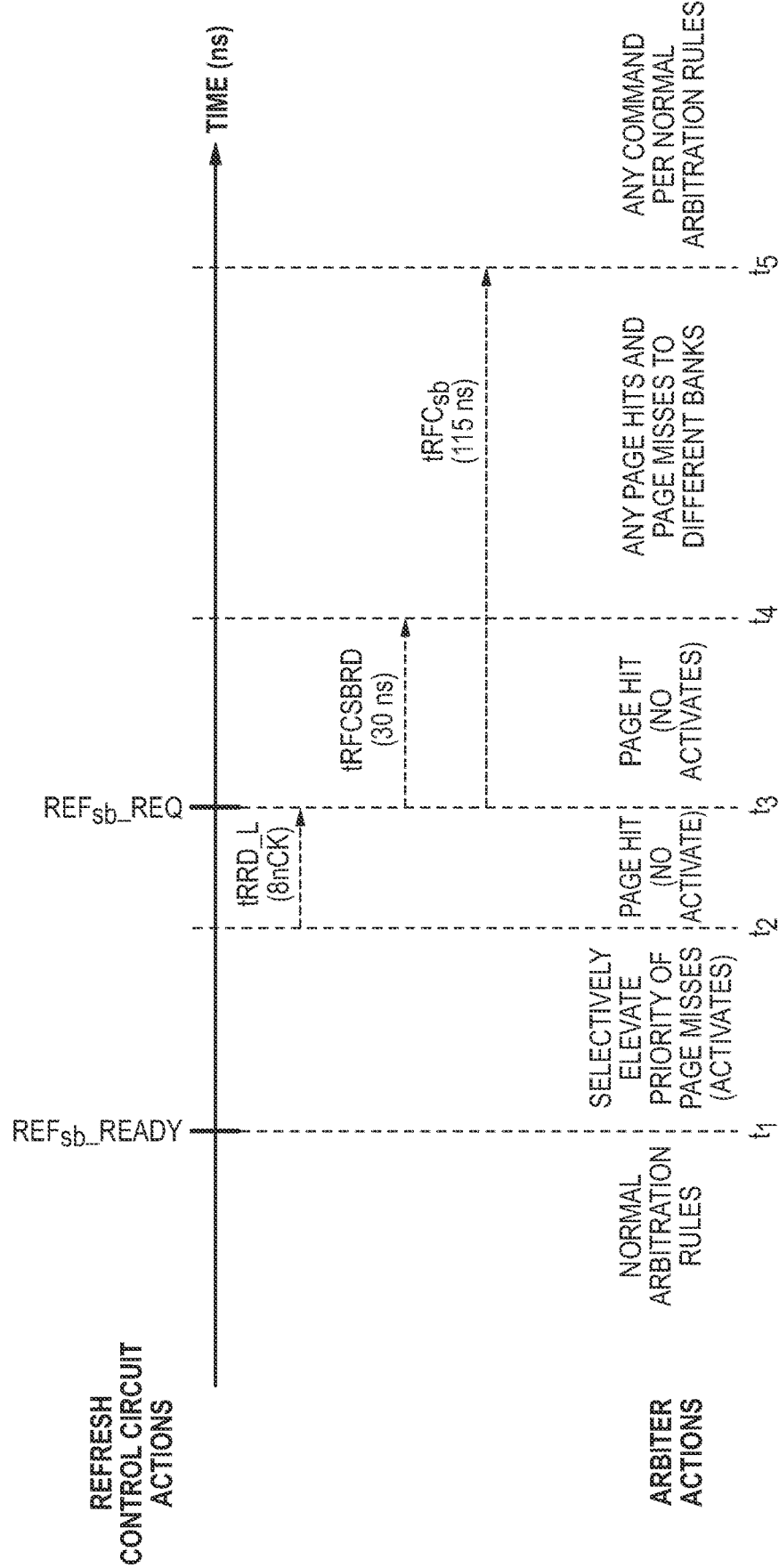
FIG. 4 illustrates a timing diagram showing the operation of the memory controller of FIG. 2.

FIG. 4 illustrates a timing diagram 400 showing the operation of the memory controller of FIG. 2. In timing diagram 400, a single horizontal axis represents time in nanoseconds (ns). Timing diagram 400 shows two activities: actions by the refresh control logic 232 above the time axis, and actions taken by arbiter 238 below the time axis. Timing diagram 400 shows five time points of interest labelled "$t_1$", "$t_2$", "$t_3$", "$t_4$", and "$t_5$".

Before time t1, arbiter 238 follows normal arbitration rules. These arbitration rules include various rules for maintaining efficiency of the DRAM bus while keeping latency low and ensuring fairness to various memory accessing agents as discussed above.

At time $t_1$, refresh control logic 232 using refresh interval timers 380 detects that a refresh will be required for a certain bank group shortly, and activates the $REF_{sb}$_READY signal in response. In response to the activation of the $REF_{sb}$_READY signal, refresh control circuit 232 monitors the number of page hits to other banks in command queue 220, and selectively elevates the priority of page misses stored in command queue 220 to increase the number of page hits available to be issued during the $REF_{sb}$ command. In some embodiments, the page misses that are elevated are to different banks in the same rank as the banks to be refreshed. The $REF_{sb}$_READY signal includes bank indication $B_j$ to indicate which bank of each bank group will be refreshed using the $REF_{sb}$ command. It elevates the priority by, for example, increasing the value of a priority field in command queue 220 for the command that arbiter 238 then evaluates against that of other commands in command queue 220. Since these commands are commands that cause the generation of ACT commands, i.e., page misses and page conflicts, arbiter 238 will preferentially issue these commands during the time period between times $t_1$ and $t_2$, thus increasing the number of page hits available during the period in which activate commands are disallowed after the $REF_{sb}$ command.

Time $t_2$ represents a time before refresh interval timers 380 indicate that the $REF_{sb}$ command can be issued to memory. This certain number of clocks is determined by a parameter for the DDR DRAM known as long row-to-row delay, tRRD_L. In one example for DDR5 memory, tRRD_L is equal to eight clock cycles (8 nCK). During the time between $t_2$ and $t_3$, arbiter 238 refrains from issuing any new ACT commands and only issues page hit commands so that the $REF_{sb}$ command can be issued according to the time tracked by the corresponding $t_{REF1}$ timer.

At time $t_3$, refresh control logic 232 activates the $REF_{sb}$_REQ to arbiter 238, allowing arbiter 238 to issue the $REF_{sb}$ command as early as the next memory command cycle. After the issuance of the $REF_{sb}$ command, arbiter 238 complies with another parameter known as tREFSBRD. In one example for DDR5 memory, tREFSBRD is equal to 30 ns, corresponding to about 100 clock cycles in currently available clock speeds, and corresponding to 12-13 read or write cycles. Between $t_2$ and $t_3$, arbiter 238 cannot issue any activate command, and may only issue page hits to other banks. Thus, refresh interval timers 380 provides $REF_{sb}$_READY early enough before $REF_{sb}$ is due to allow a sufficient number of page misses to be issued to generate enough page hits to last for (tRRD_L+tREFSBRD) number of clock cycles. The number of page hit commands needed in command queue 220 to last for (tRRD_L+tREFSBRD) number of clock cycles will vary with DDR type, density, different timing parameters, etc.

Starting at time $t_4$, arbiter 238 is able to issue page hits to any bank, as well as page misses (and activates) to any bank in any bank group except for the banks that were just refreshed. This amount of time is known as $tRFC_{SB}$ and is relatively long compared to tREFSBRD. In one example for DDR5 memory, $tRFC_{SB}$ is equal to 115 ns.

After t5, arbiter 238 can pick any type of access, including either a page hit or a page miss, to any bank without restriction. In this case, it will apply the normal arbitration rules discussed above.

As can be seen from timing diagram 400, arbiter 238 attempts to generate enough page hits to banks other than the refreshed banks to ensure that as much of the available memory bus bandwidth as possible is used. It does this by selectively elevating the priority of memory access requests in command queue 220 that generate row activate commands to the bank to be refreshed in response to receiving a same-bank refresh request from refresh control logic 232, e.g., page misses and page conflicts, according to a count of these commands in command queue 220. Refresh control logic 232 in turn uses the information provided by the $t_{REF1}$ timers to recognize an upcoming refresh request, and generates the $REF_{sb}$_REQ signal, indicating to arbiter 350 the memory bank that is about to be refreshed using the REFsb command. Arbiter 238 elevates a priority of memory access requests in command queue 220 that generate row activate commands, i.e., row conflicts and row misses, referred to collectively as row misses, to other banks in the same rank in response to receiving the same-bank refresh request. By preferentially scheduling commands that generate activate commands, arbiter 238 reduces the impact of meeting the tRFCsb parameter. By elevating the priority of row conflict and row miss commands, arbiter 238 reduces the likelihood of stalling accesses after the end of the $REF_{sb}$ command while it is waiting for tREFSBRD to expire.

The second mechanism is that based on the time from receiving the REFsb_REQ signal, arbiter 238 stops elevating the priority of memory access requests that generate the row activate commands in command queue 220.

Arbiter 238 uses these mechanisms with other, existing refresh prioritization mechanisms to ensure that the refreshes are generated appropriately. For example, if system traffic has caused refresh requests to be pending for too long, it can elevate the priority to "urgent" status.

Figure 5:
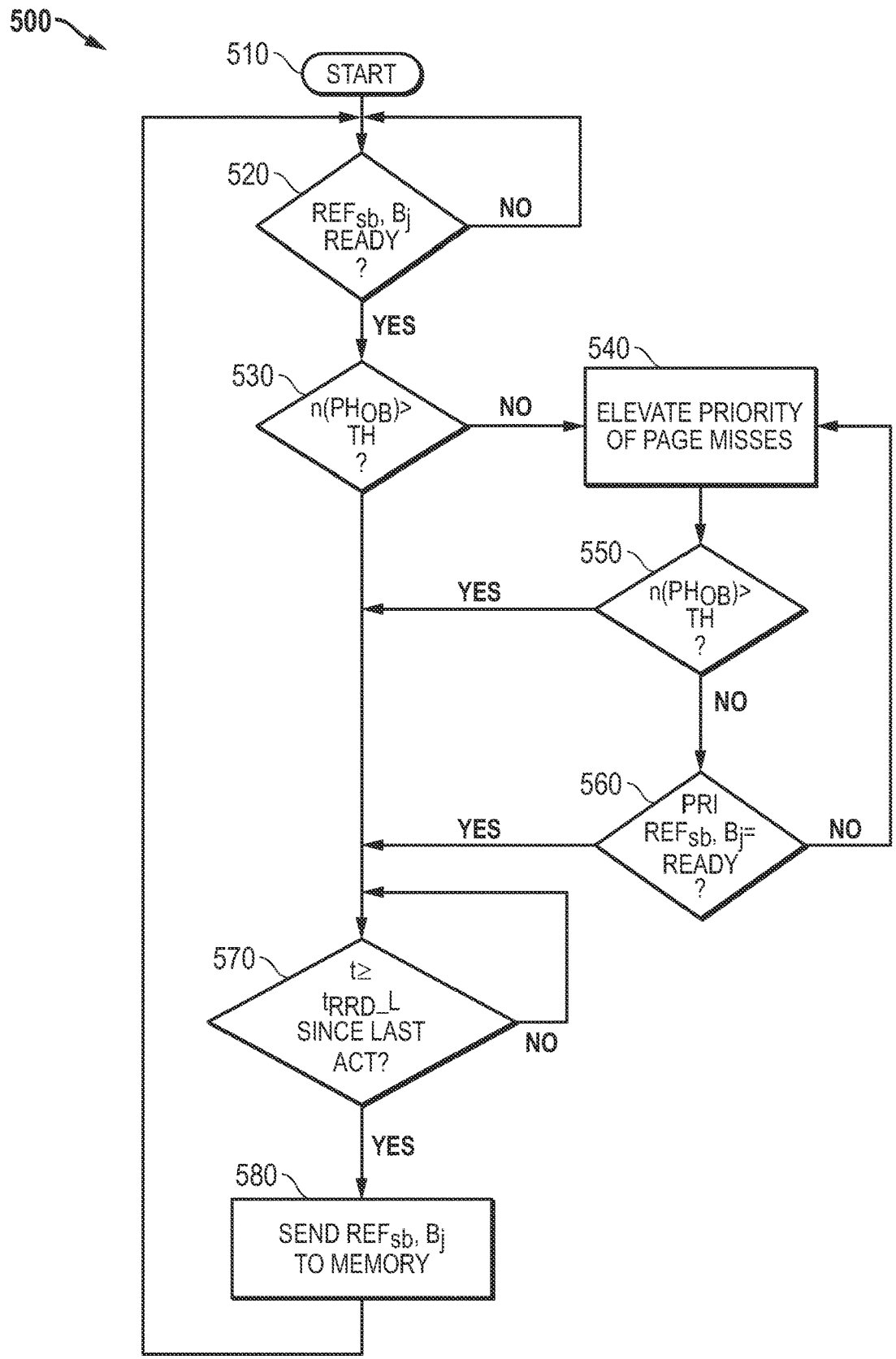
FIG. 5 illustrates a flow chart of the operation of the memory controller of FIG. 2 according to some embodiments.

FIG. 5 illustrates a flow chart 500 of the operation of the memory controller 200 of FIG. 2 according to some embodiments. Flow starts in box 510. In a decision box 520, whether a same-bank refresh to a current bank $B_j$ will soon become ready is determined. If not, the flow returns to decision box 520. If so, then flow proceeds to another decision box 530. In decision box 530, whether the number of page hits to the other banks besides bank Bj exceeds a threshold is determined.

If not, then in an action box 540, the priority of page misses, e.g., page hits and page conflicts in command queue 220, is elevated. In some embodiments, the page misses that are elevated are to different banks in the same rank as the banks to be refreshed. Then in a decision box 550, whether the number of page hits to other banks exceeds the threshold is determined. If not, then flow proceeds to decision box 560. In decision box 560, whether the priority of the REFsb command to bank Bj is urgent is determined. If so then flow proceeds to decision box 570. In not, then flow returns to action box 540.

If however in decision box 530, the number of page hits to the other banks besides bank Bj exceeds a threshold, then flow proceeds to decision box 570. Decision box 570 determines whether the elapsed time is greater than or equal to a tRRD_L number of clocks. If not, then flow remains at decision box 570. If so, flow proceeds to action box 580. In action box 580, the $REF_{sb}$ to bank $B_j$ command is sent to memory. For example, arbiter 238 may send the command to memory queue 214, which then sends it to a PHY, and the PHY provides it to the memory bus as soon as the prior command has been completed.

APU 100 of FIG. 1 or memory controller 200 of FIG. 2, or any portions thereof, may be described or represented by a computer accessible data structure in the form of a database or other data structure which can be read by a program and used, directly or indirectly, to fabricate integrated circuits. For example, this data structure may be a behavioral-level description or register-transfer level (RTL) description of the hardware functionality in a high-level design language (HDL) such as Verilog or VHDL. The description may be read by a synthesis tool which may synthesize the description to produce a netlist including a list of gates from a synthesis library. The netlist includes a set of gates that also represent the functionality of the hardware including integrated circuits. The netlist may then be placed and routed to produce a data set describing geometric shapes to be applied to masks. The masks may then be used in various semiconductor fabrication steps to produce the integrated circuits. Alternatively, the database on the computer accessible storage medium may be the netlist (with or without the synthesis library) or the data set, as desired, or Graphic Data System (GDS) II data.

While particular embodiments have been described, various modifications to these embodiments will be apparent to those skilled in the art. For example, while the memory controller and same-bank refresh technique were described with respect to an APU that is suitable for consumer applications, they may also be used in a processor for a server application. The same-bank refresh command could be used in systems with other types of refresh commands such as all-bank refresh commands and/or per-bank refresh commands. Also, the mechanisms for ensuring an adequate number of page hit commands are available may vary. The exemplary arbiter includes a page hit sub-arbiter, a page conflict sub-arbiter, and a page miss sub-arbiter. In other embodiments, the page conflict and page misses can be combined in the same sub-arbiter. Moreover, various embodiments may use different numbers of sub-arbiters.

Accordingly, it is intended by the appended claims to cover all modifications of the disclosed embodiments that fall within the scope of the disclosed embodiments.

What is claimed is:

1. A memory controller, comprising:
an arbiter implemented as a circuit configured to elevate a priority of memory access requests that generate row activate commands in response to receiving a same-bank refresh request, and to send a same-bank refresh command in response to receiving the same-bank refresh request.

2. The memory controller of claim 1, further comprising:
a command queue for storing said memory access requests; and
a refresh control circuit operative to periodically generate same-bank refresh requests including the same-bank refresh request,
wherein the arbiter is further operable to select commands from the command queue and to send the commands to a memory interface.

3. The memory controller of claim 2, wherein:
the refresh control circuit is operative to generate a same-bank refresh ready signal in response to detecting a predetermined number of row-hit commands in the command queue; and
the arbiter is responsive to the same-bank refresh ready signal to send a corresponding same-bank refresh command to the memory interface.

4. The memory controller of claim 3, wherein the refresh control circuit is further operative to generate the same-bank refresh ready signal in response to the same-bank refresh request achieving an urgent status.

5. The memory controller of claim 3, wherein the arbiter is further operative to delay sending the corresponding same-bank refresh command until at least a first predetermined amount of time has passed after a last activate command.

6. The memory controller of claim 3, wherein the arbiter stops elevating the priority of the memory access requests that generate the row activate commands in the command queue in response to sending the corresponding same-bank refresh command.

7. The memory controller of claim 2, wherein the arbiter selectively elevates page misses to different banks in the same rank as banks to be refreshed.

8. A data processing system comprising:
a data processor for generating memory access requests; and
an arbiter implemented as a circuit configured to elevate a priority of the memory access requests that generate row activate commands in response to receiving a same-bank refresh request, and to send a same-bank refresh command in response to receiving the same-bank refresh request.

9. The data processing system of claim 8, further comprising:
a command queue for storing said memory access requests; and
a refresh control circuit operative to periodically generate same-bank refresh requests including the same-bank refresh request,
wherein the arbiter is further operable to select commands from the command queue and to send the commands to a memory interface.

10. The data processing system of claim 9, wherein:
the refresh control circuit is operative to generate a same-bank refresh ready signal in response to detecting a predetermined number of row-hit commands in the command queue; and
the arbiter is responsive to the same-bank refresh ready signal to send a corresponding same-bank refresh command to the memory interface.

11. The data processing system of claim 10, wherein the refresh control circuit is further operative to generate the same-bank refresh ready signal in response to the same-bank refresh request achieving an urgent status.

12. The data processing system of claim 10, wherein the arbiter is further operative to delay sending the same-bank refresh command until at least a first predetermined amount of time has passed after a last activate command.

13. The data processing system of claim 10, wherein the arbiter stops elevating the priority of the memory access requests that generate the row activate commands in the command queue in response to sending the same-bank refresh command.

14. The data processing system of claim 13, wherein the arbiter stops sending the memory access requests that generate the row activate commands for a second predetermined amount of time after sending the corresponding same-bank refresh command to the memory interface.

15. The data processing system of claim 14, wherein the arbiter stops sending memory access commands to the same bank as the same-bank refresh command for a third predetermined amount of time after sending the corresponding same-bank refresh command to the memory interface, wherein the third predetermined amount of time is longer than the second predetermined amount of time.

16. The data processing system of claim 9, wherein the arbiter selectively elevates page misses to different banks in the same rank as banks to be refreshed.

17. A method, comprising:
storing memory access requests in a command queue;
periodically generating same-bank refresh requests;
selecting commands from the command queue and sending a same-bank refresh command to a memory interface in response to a same-bank refresh request; and
elevating a priority of the memory access requests in the command queue that generate row activate commands in response to receiving the same-bank refresh request.

18. The method of claim 17, further comprising:
generating a same-bank refresh ready signal in response to one of detecting a predetermined number of row-hit commands in the command queue and the same-bank refresh request achieving an urgent status; and
sending a corresponding same-bank refresh command to the memory interface responsive to the same-bank refresh ready signal.

19. The method of claim 18, further comprising:
stopping elevating the priority of the memory access requests that generate the row activate commands in the command queue in response to sending the corresponding same-bank refresh command.

20. The method of claim 17, wherein elevating comprises:
selectively elevating page misses to different banks in the same rank as banks to be refreshed.

* * * * *